United States Patent
Hiddink et al.

(10) Patent No.: US 7,801,063 B2
(45) Date of Patent: Sep. 21, 2010

(54) METHOD AND APPARATUS FOR RATE FALLBACK IN A WIRELESS COMMUNICATION SYSTEM

(75) Inventors: Gerrit Willem Hiddink, Utrecht (NL); Leo Monteban, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 1168 days.

(21) Appl. No.: 10/670,747

(22) Filed: Sep. 25, 2003

(65) Prior Publication Data

US 2005/0086569 A1    Apr. 21, 2005

(51) Int. Cl.
*H04B 7/00* (2006.01)
*H04L 12/28* (2006.01)
*H04L 12/26* (2006.01)
*H04L 1/00* (2006.01)

(52) U.S. Cl. .............. 370/310; 714/749; 370/216; 370/235; 370/391; 370/395.21

(58) Field of Classification Search .......... None
See application file for complete search history.

(56) References Cited

U.S. PATENT DOCUMENTS

| | | | |
|---|---|---|---|
| 5,963,559 A | 10/1999 | Ohki | |
| 7,366,476 B2 * | 4/2008 | Ishii et al. | 455/69 |
| 2001/0034209 A1 | 10/2001 | Tong et al. | |

FOREIGN PATENT DOCUMENTS

| | | |
|---|---|---|
| EP | 0 964 534 | 12/1999 |
| EP | 1 096 729 | 5/2001 |
| JP | 61054521 (A) | 3/1986 |
| JP | 9055841 (A) | 2/1997 |
| WO | WO 03/017560 | 2/2003 |

OTHER PUBLICATIONS

Moelard et al., "Enhanced Data Rate Control for Wireless Communication," European Patent Application No. 99302624.4 (Apr. 1, 1999).

* cited by examiner

*Primary Examiner*—Ayaz R Sheikh
*Assistant Examiner*—Blanche Wong
(74) *Attorney, Agent, or Firm*—Ryan, Mason & Lewis, LLP

(57) ABSTRACT

A method and apparatus are disclosed for reducing a transmission rate for retransmission of a current frame in a wireless communication system. The reduced transmission rate increases the probability that the current frame is correctly transmitted and acknowledged. The transmission rate is progressively reduced for the current frame to avoid the expiration of the frame's retry count, while not affecting the transmission rate of subsequent frames. The next frame should be transmitted at the highest rate permitted by the signal quality. A disclosed retry count expiry avoidance algorithm increases the reliability of a retransmission by lowering the transmission rate for the current frame when an acknowledgement is not received. When an acknowledgement is not received, the transmitting station proceeds to a retransmitting state where the transmitting station first attempts to retransmit the frame at the same rate. When the number of "equal rate attempts" is exceeded, the retry count expiry avoidance algorithm enters to a fallback state, where the transmission rate is decreased in a progressive manner.

25 Claims, 4 Drawing Sheets

TRANSMISSION RATE TABLE – 500

| 1st ATTEMPT | EQUAL RATE RETRY | 2nd RETRY | 3rd RETRY | 4th RETRY | 5th RETRY | 6th RETRY |
|---|---|---|---|---|---|---|
| 54 | 54 | 36 | 24 | 11 | 5.5 | 2 |
| 48 | 48 | 36 | 24 | 11 | 5.5 | 2 |
| 36 | 36 | 24 | 11 | 5.5 | 2 | 1 |
| 24 | 24 | 11 | 5.5 | 2 | 1 | 1 |
| 18 | 18 | 11 | 5.5 | 2 | 1 | 1 |
| 12 | 12 | 11 | 5.5 | 2 | 1 | 1 |
| 11 | 11 | 5.5 | 2 | 1 | 1 | 1 |
| 9 | 9 | 5.5 | 2 | 1 | 1 | 1 |
| 6 | 6 | 5.5 | 2 | 1 | 1 | 1 |
| 5.5 | 5.5 | 2 | 1 | 1 | 1 | 1 |
| 2 | 2 | 1 | 1 | 1 | 1 | 1 |
| 1 | 1 | 1 | 1 | 1 | 1 | 1 |

METHOD AND APPARATUS FOR RATE FALLBACK IN A WIRELESS COMMUNICATION SYSTEM

FIELD OF THE INVENTION

The present invention relates generally to quality of service in wireless communication systems, and more particularly, to techniques for retransmitting data in such wireless communication systems.

BACKGROUND OF THE INVENTION

In a wireless digital communication system, a station obtains access to the medium for transmission (e.g., a radio frequency) by deploying an access algorithm. A system according to the IEEE 802.11 Wireless LAN standards, for example, typically uses the Carrier Sense Multiple Access (CSMA) algorithm. The CSMA algorithm initially listens to the medium and begins transmitting when the signal level is below a certain threshold. Even with the CSMA algorithm, however, collisions will occur. For example, a collision will occur when two or more stations start transmitting at the same moment. The 802.11 standard provides a mechanism to reduce this probability by using a random back-off counter and using priority windows for transmitting certain packets. Even when a collision does not occur, a frame may not be correctly transmitted or acknowledged.

The 802.11 standard contains an acknowledgement mechanism to ensure that messages are properly received. After receiving a message in good order, the receiving station sends out an acknowledgement (ACK) message to the transmitting station. This ACK mechanism protects the system against packet loss, e.g., due to collisions. If a collision occurs, one or two stations will not receive an ACK message on their transmitted message. Nonetheless, an ACK message may not be received on a transmitted message, for example, due to (i) an inherent detection failure (a false alarm probability versus a detection probability); (ii) bad signal quality (too much time dispersion); (iii) low signal power (too large a distance); or (iv) interference at the receiving station.

A given 802.11 implementation has several mechanisms available to overcome the inability to successfully transmit a message. If the transmitting station did not receive an ACK message, the transmitting station may retransmit the original message up to N times. The transmitting station increases the random access time with each retransmission. During any of these retries, the transmitting station may do retransmissions using any suitable modulation. For example the transmitting station may successively retransmit the original message on a lower rate (thereby providing more robust modulation), according to a rate fall-back algorithm. This proceeds until the maximum number of retries, N, is reached or until the ACK message is received. The data transport layer at the destination station can conclude that a frame was lost from, for example, a gap in the sequence numbers that the transport layer assigns to each packet. A lost frame can have a negative impact on the performance of the total system. For example, the TCP/IP transport layer will typically reduce its send rate when several lost packets are detected, so that the total throughput of the system is temporarily reduced.

A need therefore exists for an improved rate fallback method and apparatus for retransmitting a lost packet. A further need exists for a mechanism to increase the probability that a frame is correctly transmitted and acknowledged, so that the above-described negative impact on the data transport layer will not occur.

SUMMARY OF THE INVENTION

Generally, a method and apparatus are disclosed for reducing a transmission rate for retransmission of a current frame to increase the probability that the current frame is correctly transmitted and acknowledged. A lower transmission rate increases the reliability of a transmission. The present invention progressively and temporarily reduces the transmission rate to avoid the expiration of the frame's retry count. The transmission rate is reduced for the current frame while not affecting the transmission rate of subsequent frames, although subsequent frames may be sent at a lower transmission rate. Generally, the next frame should be transmitted at the highest rate permitted by the signal quality.

A wireless communication device in accordance with the present invention includes a retry count expiry avoidance algorithm that increases the reliability of a retransmission by lowering the transmission rate for the current frame when an acknowledgement is not received. The retry count expiry avoidance algorithm temporarily reduces the transmission rate of the current frame in a progressive manner. The transmission rate to be used for subsequent frames is selected based on the highest rate permitted by the signal quality.

A wireless communication device is typically in a normal operating state when it is transmitting frames and receiving acknowledgements for each frame. When an acknowledgement is not received, the transmitting station proceeds to a retransmitting state where the transmitting station first attempts to retransmit the frame at the same rate. The exemplary retry count expiry avoidance algorithm first retransmits the frame for a predefined number of times at the same rate, before falling back to lower transmission rates in accordance with the invention. When the number of "equal rate attempts" is exceeded, the retry count expiry avoidance algorithm enters to a fallback state, where the transmission rate is decreased in a progressive manner. If the transmitting station receives an acknowledgement, or if the retry count for this frame has expired, then the retry count expiry avoidance algorithm restores the transmit rate that was in use before the fallback state was entered A more complete understanding of the present invention, as well as further features and advantages of the present invention, will be obtained by reference to the following detailed description and drawings.

BRIEF DESCRIPTION OF THE DRAWINGS

FIG. 5 is a sample table of exemplary retry transmission rates used by a station in the network environment of FIG. 1.

DETAILED DESCRIPTION

According to one aspect of the invention, a rate fall back mechanism is provided to increase the probability that a frame is correctly transmitted and acknowledged. The invention is based on the fact that a lower transmit rate (and corresponding modulation of the RF signals) increases the reliability of a transmission. The present invention progressively and temporarily reduces the data rate to avoid the expiration of the frame's retry count. The data rate is temporary and only to be used for the current frame while not affecting the transmit rate of subsequent frames, although subsequent frames may be sent on a lower data rate. Generally, the next frame should be transmitted at the highest rate permitted by the signal quality.

Figure 1:
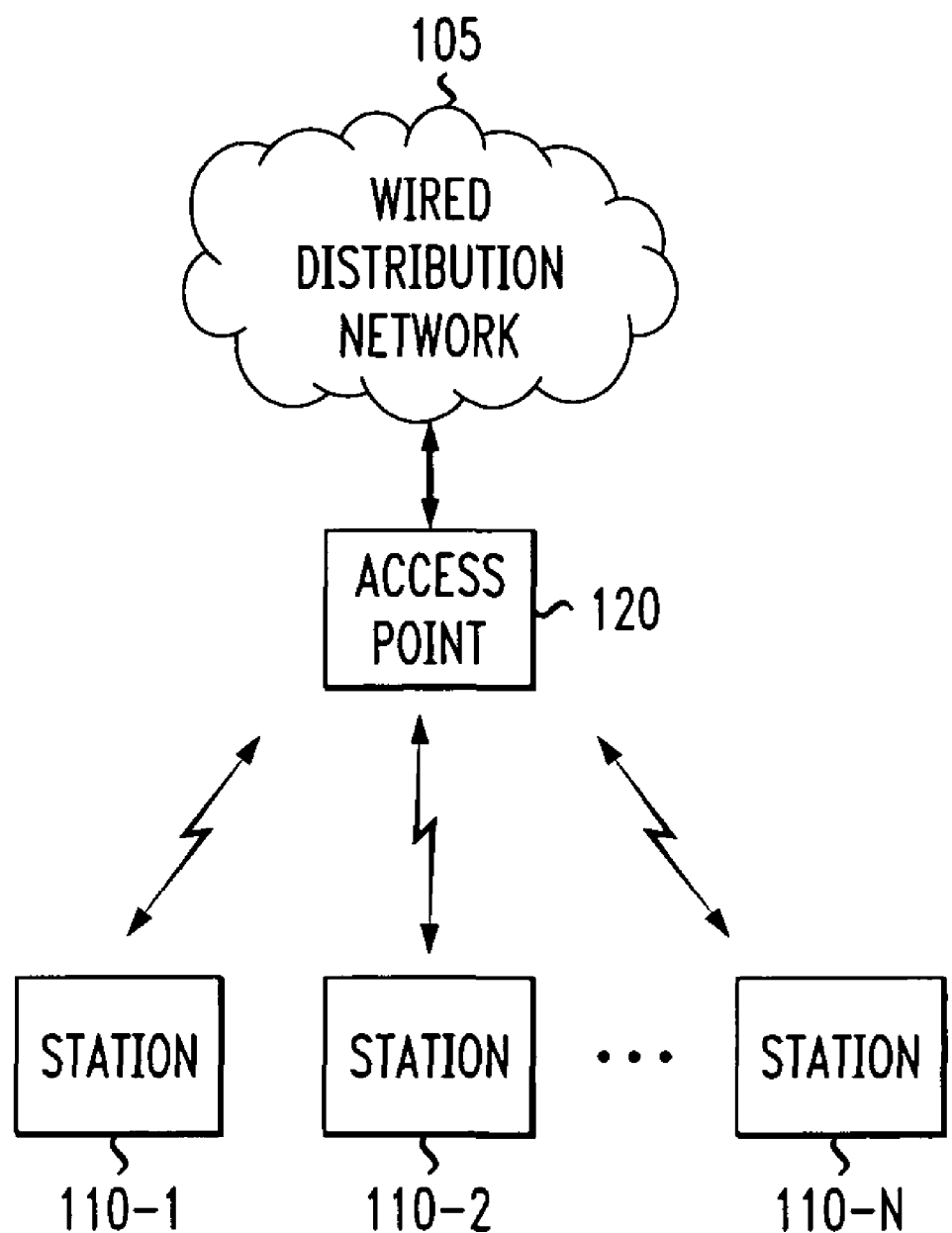
FIG. 1 illustrates a wireless network environment in which the present invention can operate.

FIG. 1 illustrates a wireless network environment 100 in which the present invention can operate. The wireless network environment 100 may be, for example, a wireless LAN or a portion thereof. As shown in FIG. 1, a number of stations 110-1 through 110-N, collectively referred to as stations 110, communicate over one or more wireless channels in the wireless digital communication system 100. An access point 120 is typically connected to a wired distribution network 105 with other access points (not shown). The access point 120 typically provides control and security functions, in a known manner. The stations 110 may each be embodied, for example, as personal computer devices, or any device having a wireless communication capability, such as a cellular telephone, personal digital assistance or pager.

The wireless network environment 100 may be implemented, for example, in accordance with the IEEE 802.11 Standard, as described, for example, in "Wireless LAN Medium Access Control (MAC) and Physical Layer (PHY) Specifications (1999); IEEE Std 802.11a; High-speed Physical Layer in the 5 GHz band; 1999; IEEE Std 802.11b; Higher-Speed Physical Layer Extension in the 2.4 GHz Band; 1999; or IEEE Std 802.11g/D1.1; Further Higher-Speed Physical Layer Extension in the 2.4 GHz Band; Draft version; January 200, each incorporated by reference herein.

Figure 2:
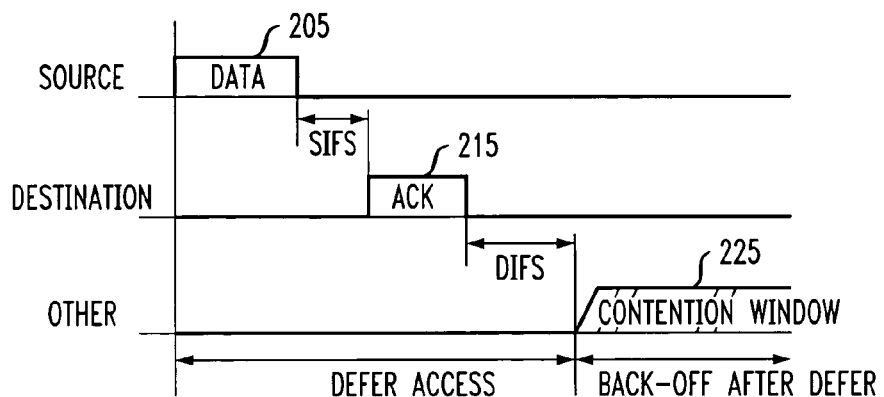
FIG. 2 illustrates a time line for an exemplary access algorithm according to the IEEE 802.11 standard.

As previously indicated, a station 110 obtains access to the medium for transmission (e.g., a radio frequency) by deploying an access algorithm 200, shown in FIG. 2. FIG. 2 illustrates a time line 200 for an exemplary access algorithm within the IEEE 802.11 standard. As shown in FIG. 2, the transmitting station 110-t starts sending data at a time 205. After the data has been received correctly by the recipient station 110-r, the recipient station 110-r transmits an ACK message back to the transmitting station 110-t, beginning at a time 215. A Short Inter Frame Space (SIFS) occurs between receipt of the data by the recipient station 110-r and transmitting the ACK message to the transmitting station 110-t. In addition, a Distributed Interframe Space (DIFS) is a period that other stations have to defer until they may start transmitting a new message. The start of the new message is deferred with a random back-off period in order to avoid collisions. Thus, a new message from another station may start a random moment within the contention window 225. Since the SIFS period is shorter than the DIFS period, it is guaranteed that other stations defer for the ACK message of stations they can observe. As indicated above, even with the access algorithm 200, collisions can occur or a frame can otherwise not be correctly transmitted or acknowledged. For example, if two or more stations have the same random back-off period, a collision can occur.

Figure 3:
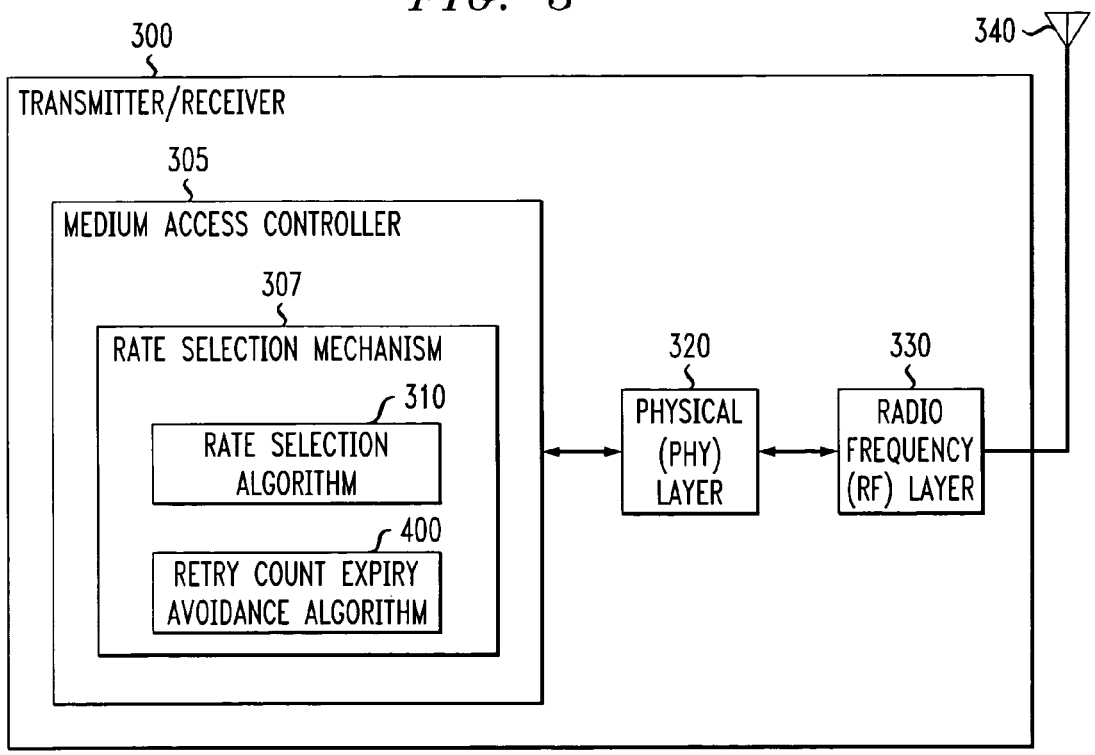
FIG. 3 is a schematic block diagram illustrating an exemplary transmitter/receiver that incorporates a rate selection mechanism incorporating features of the present invention.

FIG. 3 is a schematic block diagram illustrating an exemplary transmitter/receiver 300 that includes a rate selection mechanism 307 incorporating features of the present invention. As shown in FIG. 3, a transmitter/receiver 300 includes a Medium Access Controller (MAC) 305 that controls the transmission of data. In the exemplary embodiment, the MAC 305 includes the rate selection mechanism 307. In an alternate implementation, the rate selection mechanism 307 can be a separate device that interacts with the MAC 305. Generally, the rate selection mechanism 307 determines the rate and modulation to be used by the Physical (PHY) layer 320. The PHY layer 320 provides the signal to the RF layer 330, which in turn, provides the signal to the antenna 340, in a known manner.

As shown in FIG. 3, the rate selection mechanism 307 includes a rate selection algorithm 310 and a retry count expiry avoidance algorithm 400, discussed further below in conjunction with FIG. 4. Generally, the rate selection algorithm 310 selects the maximum transmit rate possible using a known data rate selection algorithm. The retry count expiry avoidance algorithm 400 increases the reliability of a transmission by lowering the rate for the current frame when an acknowledgement is not received. More specifically, the retry count expiry avoidance algorithm 400 temporarily reduces the transmit rate in a very progressive manner of the current frame with the sole objective of reliably transmitting the current frame. The data rate to be used for consecutive frames is not affected.

Figure 4:
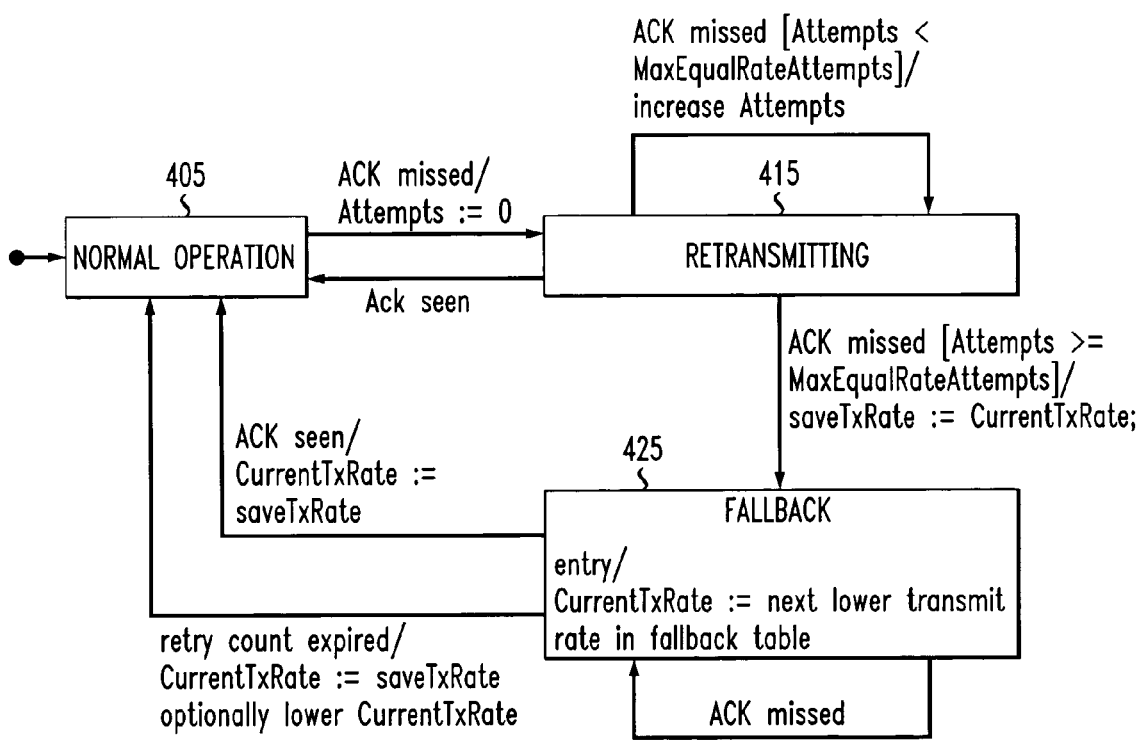
FIG. 4 is a flow chart describing an exemplary implementation of the retry count expiry avoidance algorithm of FIG. 3.

FIG. 4 is a flow chart (or state machine) describing an exemplary implementation of the retry count expiry avoidance algorithm 400. As shown in FIG. 4, the retry count expiry avoidance algorithm 400 is initially in a normal operating state 405 when it is transmitting frames and receiving acknowledgements for each frame in time. When an acknowledgement is not received, the transmitting station 110-t proceeds to a retransmitting state 415 where the transmitting station 110-t first attempts to retransmit the frame at the same rate. The number of retransmission attempts at the same rate is stored, for example, in a variable MaxEqualRateAttempts.

As previously indicated, transmission errors are not uncommon. Thus, bandwidth would be wasted if the retry count expiry avoidance algorithm 400 immediately reduced the transmit rate of a frame for the next attempt. To avoid this, the retry count expiry avoidance algorithm 400 first retransmits the frame for a limited number of times on the same rate during state 415, before falling back to lower transmit rates.

When the maximum number of "equal rate attempts" (MaxEqualRateAttempts) has been reached, the retry count expiry avoidance algorithm 400 transits to a fallback state 425. The retry count expiry avoidance algorithm 400 stores the current transmit rate, for example, in a variable saveTxRate. In this state 425, the transmit rate is decreased very rapidly. The transmit rates that are stepped through are stored in a transmission rate table 500, discussed further below in conjunction with FIG. 5, that is created when the station 110 joins an IEEE 802.11 Basic Service Set (BSS), or when the station 110 initiates communication with a certain station.

If the station 110 receives an acknowledgement, or if the retry count for this frame has expired, then the retry count expiry avoidance algorithm 400 returns to the normal operating state 405 to restore the transmit rate that was in use before the station started a fallback (from the variable saveTxRate). The station 110 could decide to lower the data rate for subsequent frames if it has reasons to believe that the channel conditions are not sufficiently good for the current data rate.

In one variation of the retry count expiry avoidance algorithm 400, the "equal rate retries" performed during the retransmission state 415 can be skipped, and the retry count expiry avoidance algorithm 400 can proceed directly to the fallback state 425 if the signal quality is not sufficient to support the current data rate.

FIG. 5 is a sample table 500 of exemplary retry transmission rates used by a station in the network environment 100 of FIG. 1. As shown in FIG. 5, the transmission rate table 500 includes a number of records, each corresponding to a distinct possible data rate. For each possible data rate, the transmission rate table 500 includes an entry for each equal rate attempt and each corresponding fall back rate. The exemplary transmission rate table 500 gives the data rates to be used (when MaxEqualRateAttempts=1) for each retry. The first column indicates the original data rate at which the initial transmission attempt took place; the second column is the equal rate retry; the next columns show the data rates to be used for each subsequent retry.

The exemplary transmission rate table 500 is created in the following way. First, the station 110 obtains a list of CurrentlyUsedRates by receiving SupportedRates elements from the station that it intends to communicate with, in accordance with conventional procedures of the IEEE 802.11 standard. The transmission rate table 500 consists of the data rates in the CurrentlyUsedRates list with optionally some specific data rates left out. In a CurrentlyUsedRates set that includes CCK and OFDM data rates, for example, the data rate of 6 Mbps can be left out because it is close to 5.5 Mbps and does not give sufficient reliability improvement. Similarly, a data rate of 12 Mbps can be left out because it is close to the 11 Mbps rate. The data rates that are left out depend on the specific setup of the Basic Service Set (i.e., whether an 802.11b/g mixed BSS, an 802.11g only BSS, or an 802.11a BSS).

In a further variation, additional data rates can be included or excluded from the transmission rate table 500 based on the robustness of a modulation in a specific (hardware) implementation. For example, a particular implementation of 11 Mbit/s CCK modulation may be much less robust than a 12 Mbit/s OFDM modulation implementation due to implementation specifics. In this case, the 12 Mbps would be included in the table 500 and the 11 Mbps rate would be excluded. In yet another variation, a station 110 may obtain the possible fallback data from an algorithm that selects the best fallback rate for a given situation, as would be apparent to a person of ordinary skill in the art based on the present disclosure.

For example, consider a BSS where all stations 110 are capable of using all 802.11g OFDM and 802.11b data rates. The CurrentlyUsedRates table then also consists of all data rates. The fallback table consists of the data rates in CurrentlyUsedRates with the following left out: 54 and 48 (they are too high for retransmissions), 12 and 6 (they are close to a CCK data rate), 18 and 9 (these yield insufficient increase of reliability as compared to other data rates). The fallback table then contains the following values: 36, 24, 11, 5.5, 2, and 1 Mbps.

It is to be understood that the embodiments and variations shown and described herein are merely illustrative of the principles of this invention and that various modifications may be implemented by those skilled in the art without departing from the scope and spirit of the invention.

We claim:

1. A wireless communication device, comprising:
a controller to control transmission of data at a transmission data rate and to control retransmission of said data at a retransmission data rate, wherein said retransmission is performed if an acknowledgement is not received for a current frame; and
a rate selection mechanism that progressively reduces said retransmission data rate to at least one of two or more lower retransmission data rates only for said current frame if an acknowledgement is not received for a current frame after n attempts of transmission at said transmission data rate, wherein a second lower retransmission data rate is selected if an acknowledgement is not received for a current frame after m attempts of retransmission at a first lower retransmission data rate, wherein m equals a maximum number of attempts parameter corresponding to said first lower retransmission data rate, wherein m and n are integers, and wherein m and n are greater than one.

2. The wireless communication device of claim 1, wherein a transmission data rate for a subsequent frame is selected based on an available signal quality.

3. The wireless communication device of claim 1, wherein said retransmission data rate is progressively reduced until an acknowledgement is received for said current frame or a retry count for said current frame is exceeded.

4. The wireless communication device of claim 1, wherein said retransmission data rate is selected from a table of available rates.

5. The wireless communication device of claim 4, wherein said table of available rates is populated with at least a portion of rates supported by a receiving station.

6. The wireless communication device of claim 1, wherein said retransmission data rate is determined by an algorithm that selects said retransmission data rate based on current conditions.

7. The wireless communication device of claim 1, wherein said device is implemented in accordance with the IEEE 802.11 Standard.

8. The wireless communication device of claim 1, wherein said rate selection mechanism restores a transmission data rate that was in use before said retransmission data rate was reduced.

9. The wireless communication device of claim 1, wherein said rate selection mechanism proceeds directly to a fallback state if a signal quality is not sufficient to support a data rate associated with an equal rate retry.

10. The wireless communication device of claim 1, wherein said rate selection mechanism selects one of said lower retransmission data rate based on the robustness of a corresponding modulation technique.

11. A method for wireless communication, comprising the steps of:
transmitting one or more frames at a transmission data rate and retransmitting said data at a retransmission data rate, wherein said retransmission is performed if an acknowledgement is not received for a current frame; and
reducing a retransmission rate only for a current frame when an acknowledgement is not received for said current frame, wherein said reduced retransmission data rate is progressively reduced to at least one of two or more lower retransmission data rates if an acknowledgement is not received for a current frame after n attempts of transmission at said transmission data rate, wherein a second lower retransmission data rate is selected if an acknowledgement is not received for a current frame after m attempts of retransmission at a first lower retransmission data rate, wherein m equals a maximum number of attempts parameter corresponding to said first lower retransmission data rate, wherein m and n are integers, wherein m and n are greater than one, wherein at least one of said steps is performed by an electronic device.

12. The method of claim 11, further comprising the step of selecting a transmission data rate for a subsequent frame based on an available signal quality.

13. The method of claim 11, wherein said reducing step is performed iteratively until an acknowledgement is received for said current frame or a retry count for said current frame is exceeded.

14. The method of claim 11, wherein said reducing step further comprises the step of selecting said retransmission data rate from a table of available rates.

15. The method of claim 14, wherein said table of available rates is populated with at least a portion of rates supported by a receiving station.

16. The method of claim 11, wherein said reducing step further comprises the step of selecting said retransmission data rate based on current conditions.

17. The method of claim 11, wherein said method is performed in accordance with the IEEE 802.11 Standard.

18. The method of claim 11, further comprising the step of restoring a transmission data rate that was in use before said retransmission data rate was reduced.

19. The method of claim 11, wherein said reducing step proceeds directly to a fallback state if a signal quality is not sufficient to support a data rate associated with an equal rate retry.

20. The method of claim 11, wherein one of said lower retransmission data rates is selected based on the robustness of a corresponding modulation technique.

21. A wireless communication device, comprising:
a controller to control transmission of data at a transmission data rate and to control retransmission of said data at a retransmission data rate, wherein said retransmission is performed if an acknowledgement is not received for a current frame; and
a rate selection mechanism that progressively reduces said retransmission data rate to at least one of two or more lower retransmission data rates only for said current frame if an acknowledgement is not received for a current frame and increases said transmission data rate for a subsequent frame after n attempts of transmission at said transmission data rate, wherein a second lower retransmission data rate is selected if an acknowledgement is not received for a current frame after m attempts of retransmission at a first lower retransmission data rate, wherein m equals a maximum number of attempts parameter corresponding to said first lower retransmission data rate, wherein m and n are integers, and wherein m and n are greater than one.

22. The wireless communication device of claim 21, wherein a transmission data rate for a subsequent frame is selected based on an available signal quality.

23. The wireless communication device of claim 21, wherein said retransmission data rate is progressively reduced until an acknowledgement is received for said current frame or a retry count for said current frame is exceeded.

24. The wireless communication device of claim 21, wherein said rate selection mechanism restores a transmission data rate that was in use before said retransmission data rate was reduced.

25. The wireless communication device of claim 21, wherein said rate selection mechanism selects one of said lower retransmission data rate based on the robustness of a corresponding modulation technique.

* * * * *